US012636763B2

(12) United States Patent
Broda et al.

(10) Patent No.: US 12,636,763 B2
(45) Date of Patent: May 26, 2026

(54) POWERED FASTENER DRIVER

(71) Applicant: MILWAUKEE ELECTRIC TOOL CORPORATION, Brookfield, WI (US)

(72) Inventors: Kevin Broda, Waukesha, WI (US); Coby A. Nettleton, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 19/016,331

(22) Filed: Jan. 10, 2025

(65) Prior Publication Data

US 2025/0229395 A1 Jul. 17, 2025

Related U.S. Application Data

(60) Provisional application No. 63/728,932, filed on Dec. 6, 2024, provisional application No. 63/620,321, filed on Jan. 12, 2024.

(51) Int. Cl.
*B25C 1/00* (2006.01)
*B25C 1/04* (2006.01)

(52) U.S. Cl.
CPC .............. *B25C 1/005* (2013.01); *B25C 1/008* (2013.01); *B25C 1/047* (2013.01)

(58) Field of Classification Search
CPC .......... B25C 1/005; B25C 1/008; B25C 1/047
See application file for complete search history.

(56) References Cited

U.S. PATENT DOCUMENTS

| | | | |
|---|---|---|---|
| 3,820,705 | A | 6/1974 | Beals |
| 4,136,810 | A | 1/1979 | Bull |
| 4,375,867 | A | 3/1983 | Novak et al. |
| 5,038,993 | A | 8/1991 | Schafer et al. |
| 5,238,167 | A | 8/1993 | Howard et al. |
| 5,437,404 | A | 8/1995 | Shkolnikov |
| 5,647,525 | A | 7/1997 | Ishizawa |
| 5,803,338 | A | 9/1998 | Singer et al. |
| 6,053,389 | A | 4/2000 | Chu et al. |
| 6,145,727 | A | 11/2000 | Mukoyama et al. |
| 6,502,737 | B2 | 1/2003 | Akiba |

(Continued)

FOREIGN PATENT DOCUMENTS

CN 103770079 A 5/2014

*Primary Examiner* — Michelle Lopez
(74) *Attorney, Agent, or Firm* — Michael Best & Friedrich LLP

(57) ABSTRACT

A powered fastener driver may include a magazine configured to receive the fasteners of a first length and the fasteners of a second length. A powered fastener driver may include a nosepiece assembly defining a driver channel extending along the driving axis, the nosepiece assembly including a nosepiece member defining an opening by which the fasteners of the first length and the fasteners of the second length pass from the magazine into the driver channel, and a nail guide assembly including a nail guide member defining a nail guide surface, the nail guide member being pivotable relative to the nosepiece member about a pivot axis between a first position at which the nail guide surface partially closes the opening, and a second position at which the nail guide surface is not aligned with the opening, and a biasing member biasing the nail guide member toward the first position.

20 Claims, 15 Drawing Sheets

(56) References Cited

U.S. PATENT DOCUMENTS

| | | | |
|---|---|---|---|
| 6,592,016 | B2 | 7/2003 | Hamano et al. |
| 6,598,777 | B2 | 7/2003 | Osuga et al. |
| 6,622,901 | B2 | 9/2003 | Hamano et al. |
| 6,641,022 | B2 | 11/2003 | Hamano et al. |
| 6,679,414 | B2 | 1/2004 | Rotharmel |
| 6,739,490 | B1 | 5/2004 | Shkolnikov et al. |
| 6,789,718 | B2 | 9/2004 | Canlas et al. |
| 6,796,476 | B2 | 9/2004 | Birk et al. |
| 6,808,101 | B2 | 10/2004 | Laubach et al. |
| 6,908,021 | B1 | 6/2005 | Wang |
| 6,938,809 | B1 | 9/2005 | Schnell |
| 7,025,242 | B1 | 4/2006 | Schnell |
| 7,028,875 | B1 | 4/2006 | Beville et al. |
| 7,143,508 | B2 | 12/2006 | Schnell et al. |
| 7,243,831 | B2 | 7/2007 | Ishizawa et al. |
| 7,398,905 | B2 | 7/2008 | Chen et al. |
| 7,628,304 | B2 | 12/2009 | Yamamoto et al. |
| 8,220,687 | B2 | 7/2012 | Yamamoto et al. |
| 8,684,245 | B2 | 4/2014 | Canlas, Jr. et al. |
| 8,931,676 | B2 | 1/2015 | Braddock |
| 9,346,156 | B1 | 5/2016 | Fago |
| 9,469,022 | B2 | 10/2016 | Ishikawa |
| 9,527,196 | B2 | 12/2016 | Segura |
| 10,144,120 | B2 | 12/2018 | Segura |
| 10,232,498 | B2 | 3/2019 | Nishida et al. |
| 10,350,741 | B2 | 7/2019 | Brendel et al. |
| 10,688,640 | B2 | 6/2020 | Bodin et al. |
| 11,161,230 | B2 | 11/2021 | Canlas, Jr. et al. |
| 2006/0102683 | A1 | 5/2006 | Schnell et al. |
| 2006/0102685 | A1 | 5/2006 | Phillips et al. |
| 2006/0108389 | A1 | 5/2006 | Phillips |
| 2006/0108390 | A1 | 5/2006 | Schnell et al. |
| 2006/0144888 | A1 | 7/2006 | Schnell |
| 2008/0067212 | A1 | 3/2008 | Wen |
| 2008/0264998 | A1 | 10/2008 | Lee |
| 2010/0206934 | A1 | 8/2010 | Vallon et al. |
| 2013/0320062 | A1 | 12/2013 | Segura |
| 2014/0361066 | A1 | 12/2014 | Liu et al. |
| 2020/0290189 | A1* | 9/2020 | Owens .................... B25C 1/005 |
| 2021/0299834 | A1 | 9/2021 | Canlas, Jr. et al. |
| 2022/0226977 | A1 | 7/2022 | Nettleton et al. |
| 2022/0226978 | A1 | 7/2022 | Nettleton et al. |
| 2023/0264331 | A1 | 8/2023 | Carrier |
| 2024/0300078 | A1 | 9/2024 | Yoshikane et al. |

* cited by examiner

POWERED FASTENER DRIVER

CROSS-REFERENCE TO RELATED APPLICATIONS

This application claims priority to U.S. Provisional Patent Application No. 63/728,932, filed Dec. 6, 2024, and to U.S. Provisional Patent Application No. 63/620,321, filed Jan. 12, 2024, the entire contents of all of which are incorporated herein by reference.

FIELD OF THE DISCLOSURE

The present disclosure relates to powered fastener drivers, and more particularly to powered fastener drivers adapted to operate with fasteners of varying sizes.

BACKGROUND OF THE DISCLOSURE

Users may use fasteners to attach hardware, e.g., piping clips (conduit, PVC sprinkler pipes), ceiling wire (conduit, HVAC ducts), and straps (HVAC ducts) to walls, ceilings, etc. Typically, such fasteners are driven into a workpiece by a powered fastener driver. The fasteners are collated into a strip and positioned within a magazine of the powered fastener driver. Some magazines can accommodate fasteners of different lengths.

SUMMARY OF THE DISCLOSURE

The present disclosure provides, in one aspect, a powered fastener driver for driving fasteners of a first length and fasteners of a second length greater than the first length along a driving axis, the powered fastener driver including: a magazine configured to receive the fasteners of the first length and the fasteners of the second length; and a nose-piece assembly defining a driver channel extending along the driving axis, the nosepiece assembly including a shear block coupled to the magazine and defining an opening by which the fasteners of the first length and the fasteners of the second length pass from the magazine into the driver channel, and a nail guide assembly including a nail guide member defining a nail guide surface, the nail guide member being pivotable relative to the shear block about a pivot axis between a first position at which the nail guide surface partially closes the opening, and a second position at which the nail guide surface is not aligned with the opening, and a biasing member biasing the nail guide member toward the first position; wherein in response to the fasteners of the second length being loaded into the magazine the nail guide member is moved to the second position; and wherein the pivot axis defines an oblique angle with the driving axis.

The present disclosure provides, in another aspect, a powered fastener driver for driving fasteners of a first length and fasteners of a second length greater than the first length along a driving axis, the powered fastener driver including: a magazine configured to receive the fasteners of the first length and the fasteners of the second length; and a nose-piece assembly defining a driver channel extending along the driving axis, the nosepiece assembly including a shear block coupled to the magazine and defining an opening by which the fasteners of the first length and the fasteners of the second length pass from the magazine into the driver channel, and a nail guide assembly including a nail guide member that is pivotable relative to the shear block about a pivot axis between a first position and a second position, the nail guide member including a guide portion extending away from the pivot axis in a first direction and a pressing portion extending away from the pivot axis in a second direction different than the first direction, and a biasing member biasing the nail guide member toward the first position; wherein the guide portion defines a nail guide surface that partially closes the opening in the first position; wherein the pressing portion is configured to be pressed to move the nail guide member from the first position to the second position; and wherein the nail guide surface is not aligned with the opening in the second position.

The present disclosure provides, in another aspect, a powered fastener driver for driving fasteners of a first length and fasteners of a second length greater than the first length along a driving axis, the powered fastener driver including: a magazine configured to receive the fasteners of the first length and the fasteners of the second length; and a nose-piece assembly defining a driver channel extending along the driving axis, the nosepiece assembly including a shear block coupled to the magazine and defining an opening by which the fasteners of the first length and the fasteners of the second length pass from the magazine into the driver channel, and a nail guide assembly including a nail guide member defining a nail guide surface, the nail guide member being pivotable relative to the shear block about a pivot axis between a first position at which the nail guide surface partially closes the opening, and a second position at which the nail guide surface is not aligned with the opening, and a biasing member biasing the nail guide member toward the first position; wherein in response to the fasteners of the second length being loaded into the magazine the nail guide member is moved to the second position; and wherein the biasing member is positioned between the nail guide member and a wall of the magazine.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 11:
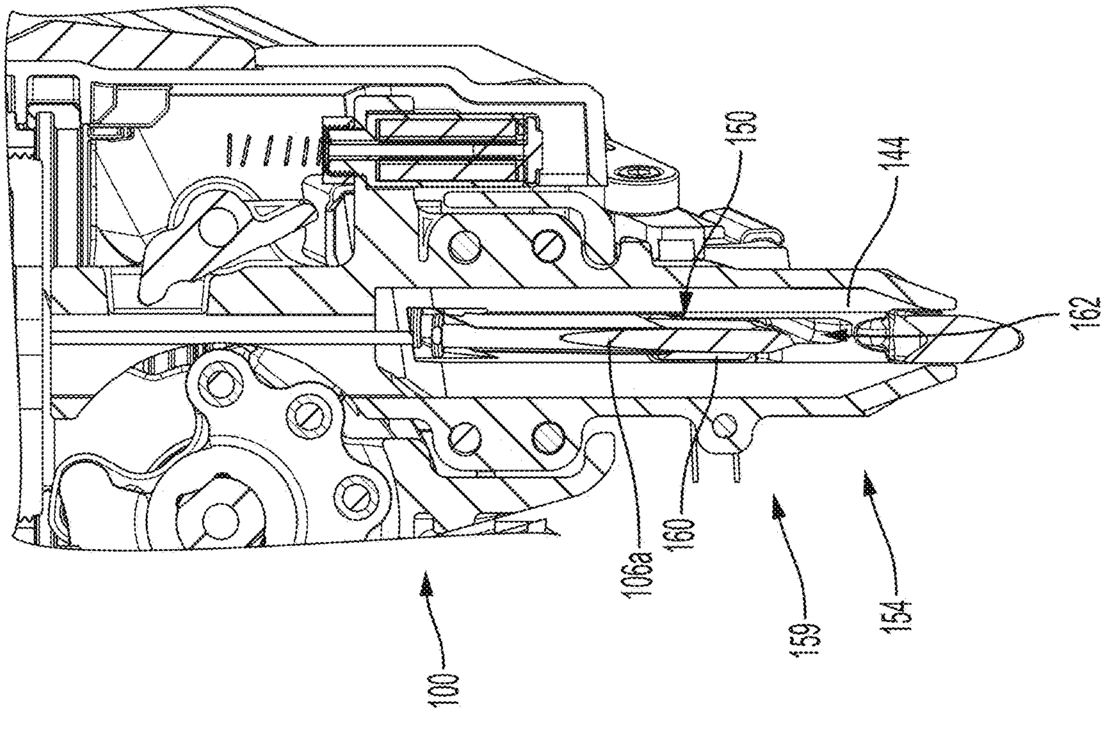
FIG. 11 is another cross-sectional view of the fastener driver of FIG. 1, taken along line 9-9 of FIG. 1 and showing a short nail guide member in a second position.

FIGS. 1-6 illustrate a power tool, such as a gas spring-powered fastener driver 100, operable to drive fasteners (e.g., nails, tacks, staples, etc.) held within a magazine 104 into a workpiece. The fastener driver 100 is configured as a multi-shot powered nailer including the magazine 104 holding a collated strip of nails, allowing the user to perform multiple fastening operations without having to manually reload the fastener driver after each driving cycle. In other embodiments, the fasteners can instead be embodied as staples, brads, etc. The fastener driver 100 can drive two different-length nails depending, for example, on the thickness of the workpiece to be fixed in place. The magazine 104 is capable of accommodating either long nails 106*a* (FIG. 9) or short nails 106*b* (FIG. 11), and advancing the nails 106*a*, 106*b* toward a firing position within the fastener driver 100. Although the magazine 104 will be described below in the context of the gas spring-powered fastener driver 100, the magazine 104 can equally be applied to other types of fastener drivers (e.g., a combustion nailer, a gas-free nailer, a pneumatic nailer, etc.).

Figure 2:
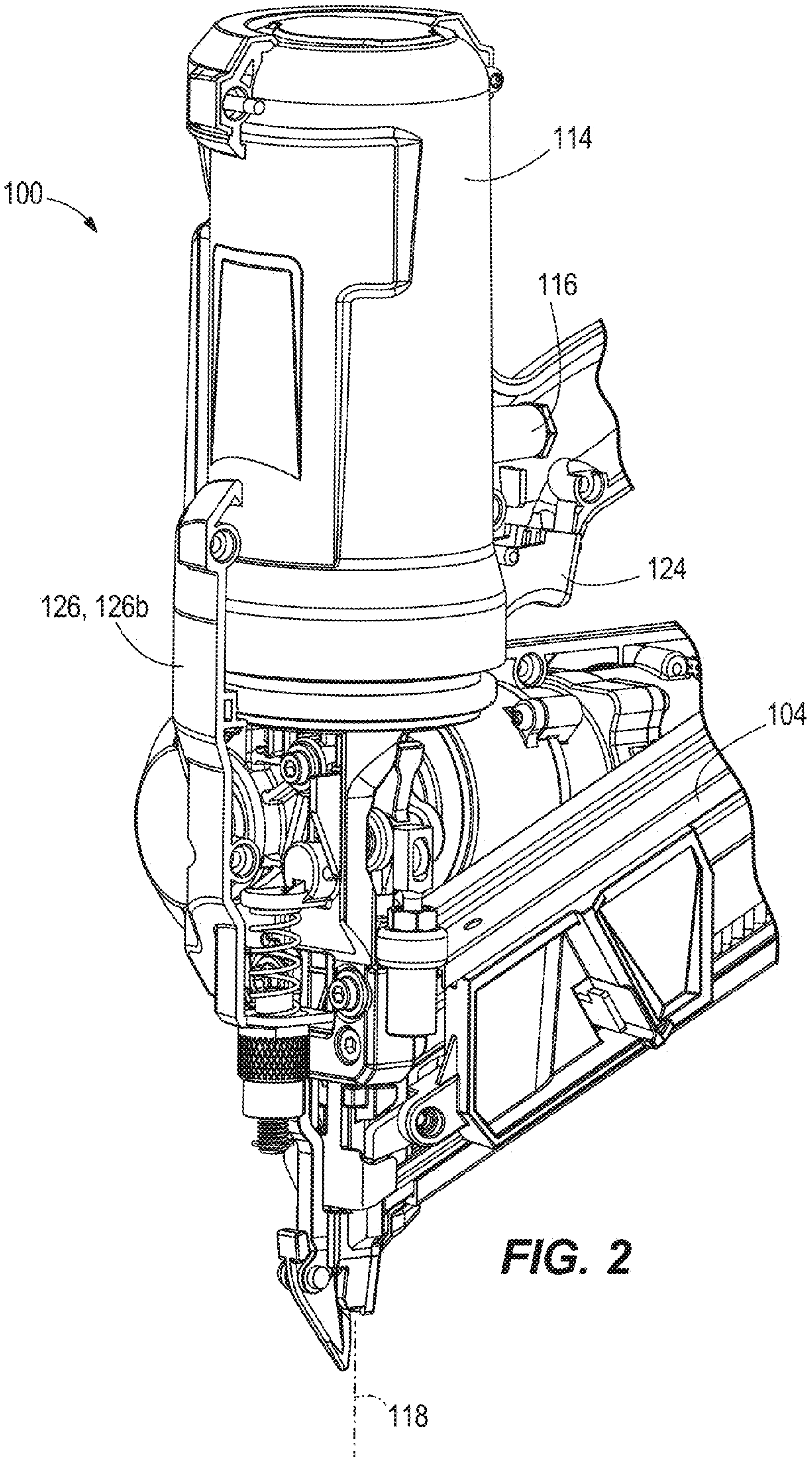
FIG. 2 is a partial cut-away view of the fastener driver of FIG. 1.
Figure 5:
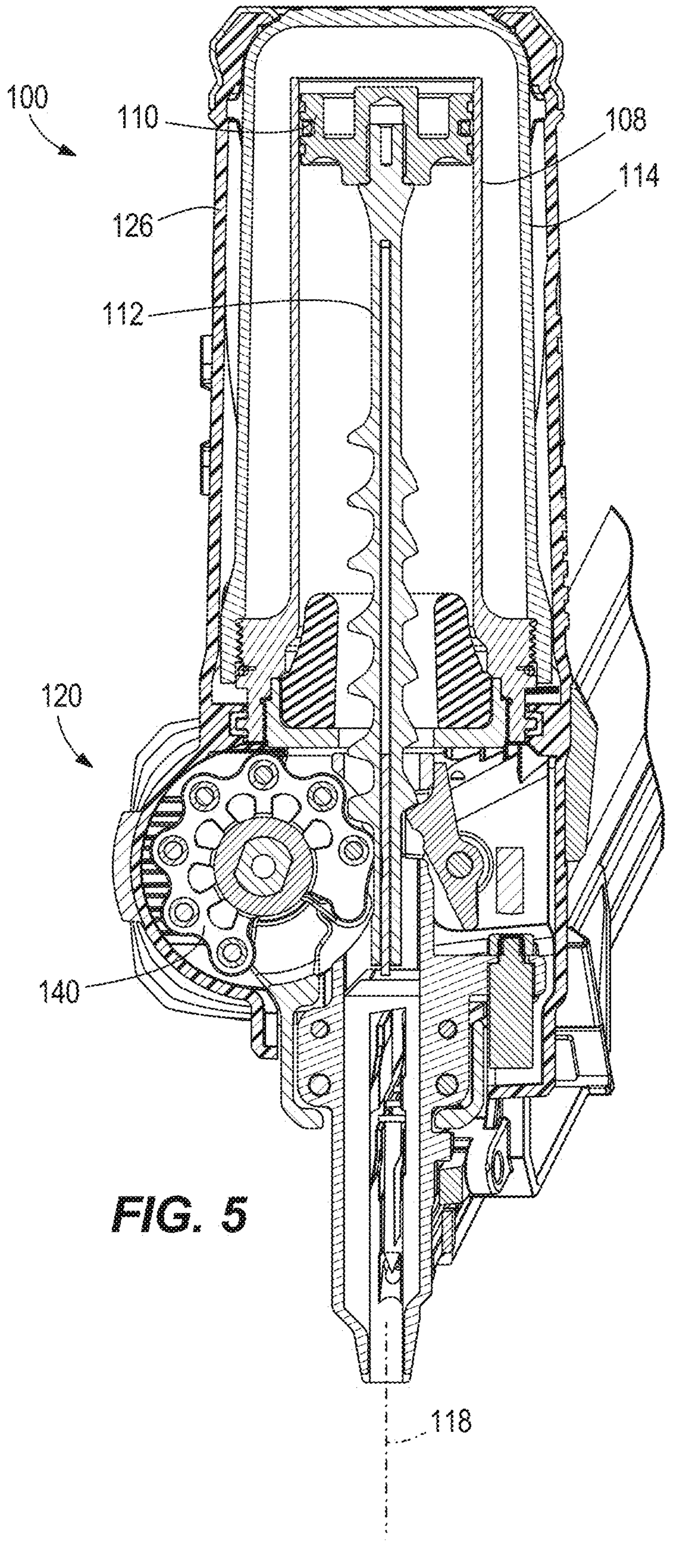
FIG. 5 is a cross-sectional view of the fastener driver of FIG. 1 taken along line 5-5 of FIG. 3, illustrating a driver blade in a ready position.
Figure 6:
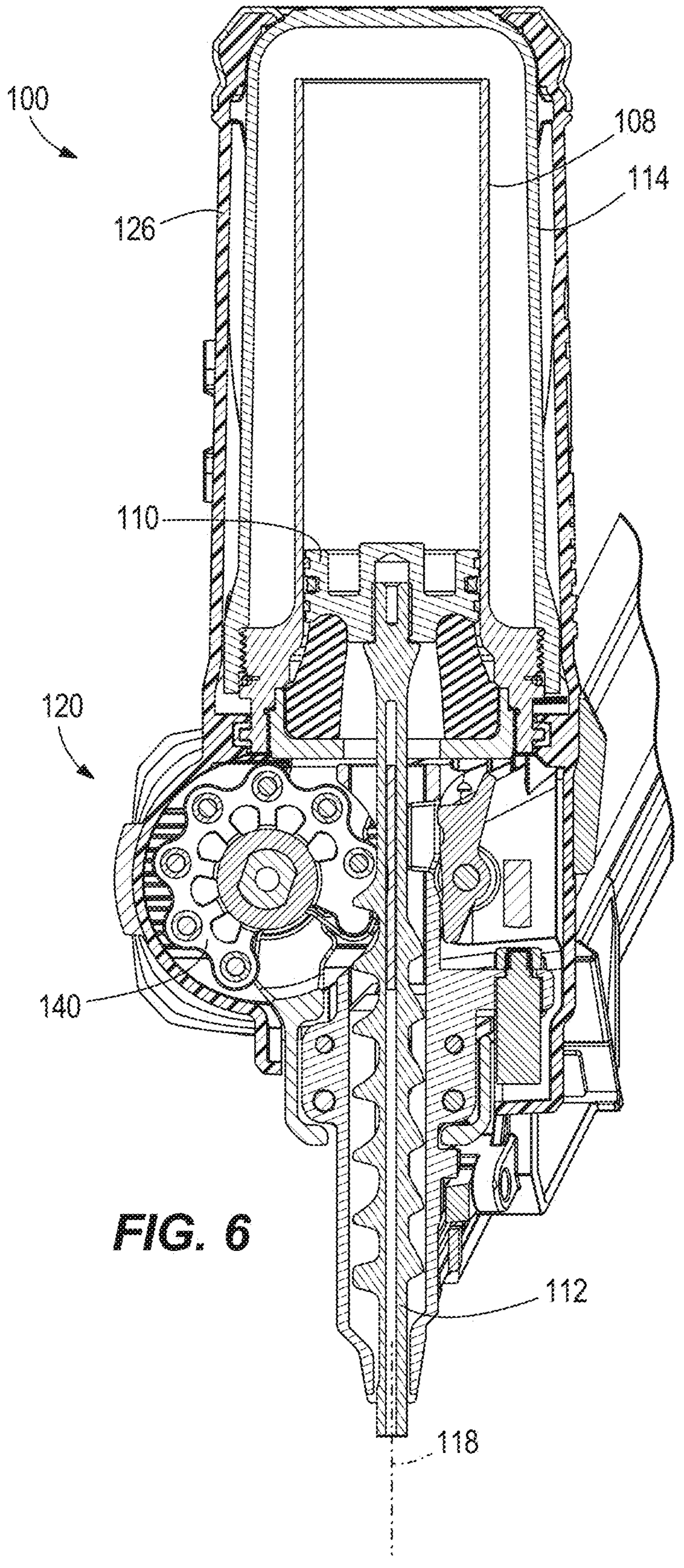
FIG. 6 is a cross-sectional view of the fastener driver of FIG. 1 taken along line 5-5 of FIG. 3, illustrating the driver blade in a driven position.

With reference to FIGS. 5 and 6, the gas spring-powered fastener driver 100 includes a cylinder 108 and a moveable piston 110 positioned within the cylinder 108. The fastener driver 100 further includes a driver blade 112 that is attached to the piston 110 and moveable therewith. The fastener driver 100 does not require an external source of air pressure, but rather includes a storage chamber cylinder 114 of pressurized gas in fluid communication with the cylinder 108. In the illustrated embodiment, the cylinder 108 and moveable piston 110 are positioned within the storage chamber cylinder 114. With reference to FIG. 2, the driver 100 further includes a fill valve 116 coupled to the storage chamber cylinder 114. When connected with a source of compressed gas, the fill valve 116 permits the storage chamber cylinder 114 to be refilled with compressed gas if any prior leakage has occurred. The fill valve 116 may be configured as a Schrader valve, for example.

The cylinder 108 and the driver blade 112 define a driving axis 118, and during a driving cycle the driver blade 112 and piston 110 are moveable between a ready position (i.e., top dead center; see FIG. 5) and a driven position (i.e., bottom dead center; see FIG. 6). The fastener driver 100 further includes a lifting assembly 120, which is powered by a motor 122 (FIG. 4), and which is operable to move the driver blade 112 from the driven position to the ready position.

Figure 1:
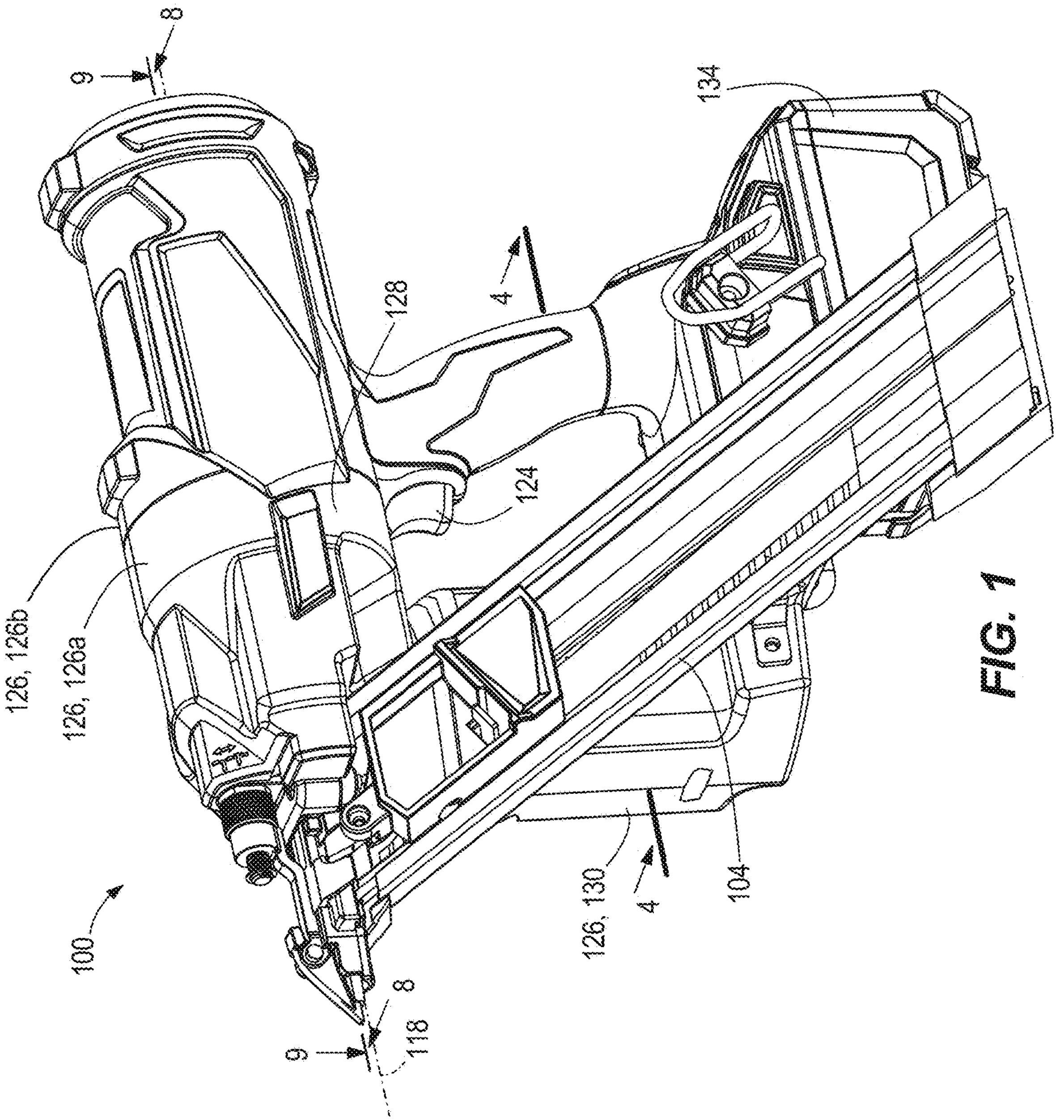
FIG. 1 is a perspective view of a gas spring-powered fastener driver in accordance with an embodiment of the disclosure.

In operation, the lifting assembly 120 drives the piston 110 and the driver blade 112 to the ready position by energizing the motor 122. As the piston 110 and the driver blade 112 are driven to the ready position, the gas above the piston 110 and the gas within the storage chamber cylinder 114 is compressed. Once in the ready position, the piston 110 and the driver blade 112 are held in position until released by user activation of a trigger 124 (FIG. 1). When released, the compressed gas above the piston 110 and within the storage chamber cylinder 114 drives the piston 110 and the driver blade 112 to the driven position, thereby driving the nail 106*a*, 106*b* into a workpiece. The illustrated fastener driver 100 therefore operates on a gas spring principle utilizing the lifting assembly 120 and the piston 110 to further compress the gas within the cylinder 108 and the storage chamber cylinder 114. Further detail regarding the structure and operation of the fastener driver 100 is provided below.

Figure 3:
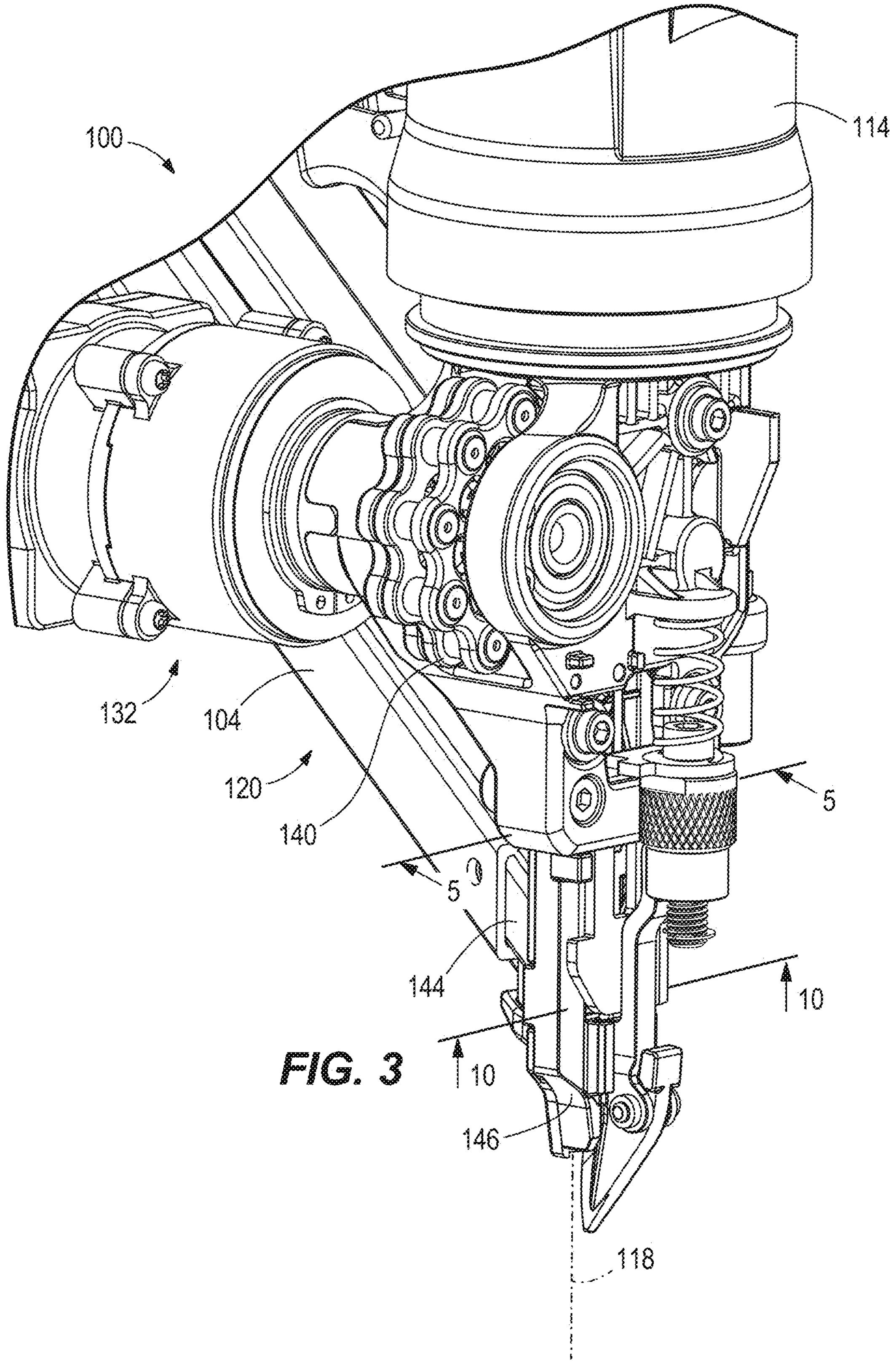
FIG. 3 is another partial cut-away view of the fastener driver of FIG. 1.
Figure 4:
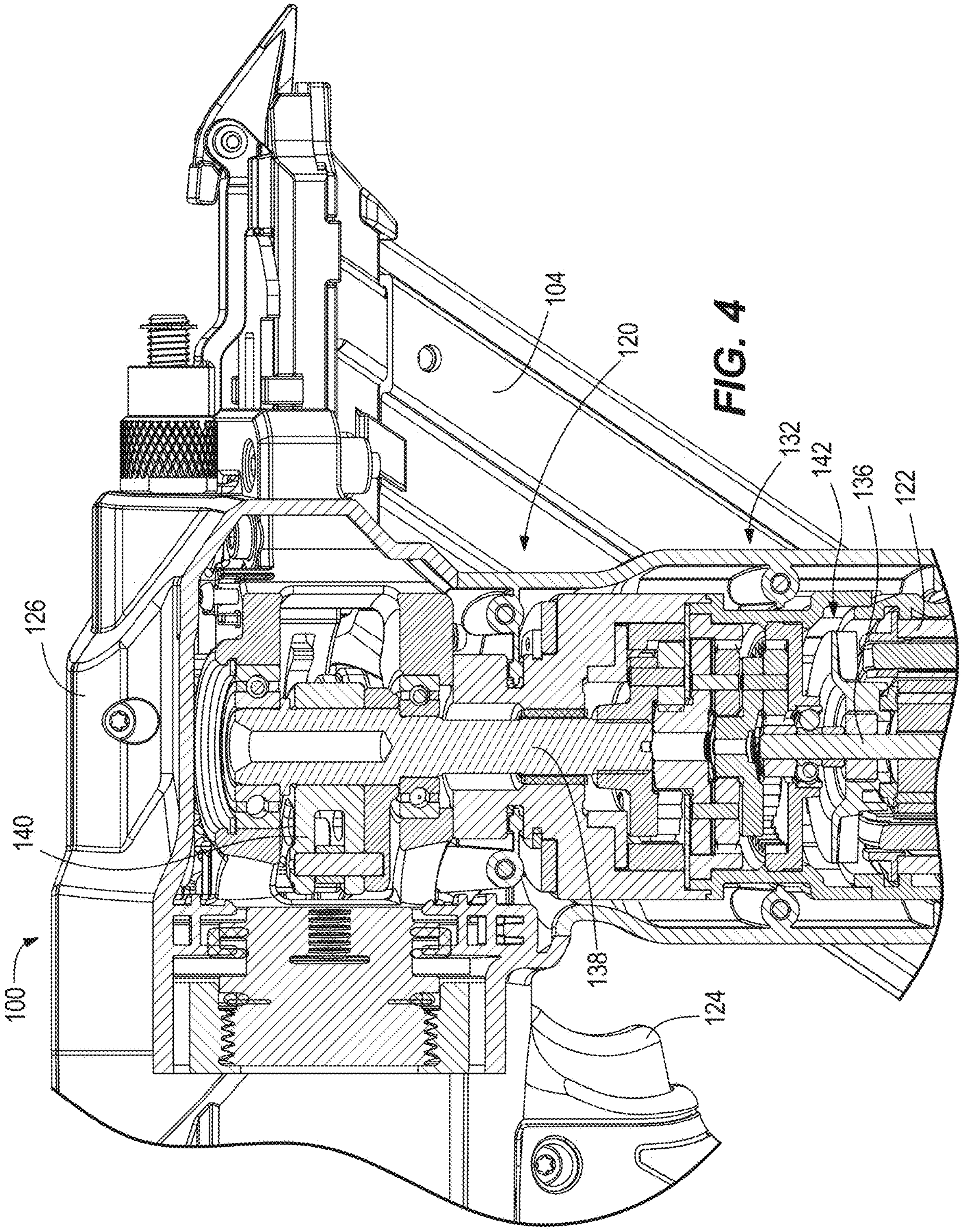
FIG. 4 is a cross-sectional view of the fastener driver of FIG. 1 taken along line 4-4 shown in FIG. 1, illustrating a motor, a transmission, and a fan assembly.

With reference to FIGS. 2 and 3, the fastener driver 100 includes a housing 126 formed from clamshell housing halves 126*a*, 126*b*. The housing 126 includes a cylinder support portion 128 (FIG. 1) in which the storage chamber cylinder 114 is at least partially positioned, and a transmission housing portion 130 in which a transmission 132 is at least partially positioned. The transmission 132 is a component of the lifting assembly 120, which raises the driver blade 112 from the driven position to the ready position. With reference to FIG. 4, the motor 122 is also a component of the lifting assembly 120 and is coupled to the transmission housing portion 130 for providing torque to the transmission 132 when activated. A battery 134 (FIG. 1) is electrically connectable to the motor 122 for supplying electrical power to the motor 122. In alternative embodiments, the driver may be powered from an AC voltage input (i.e., from a wall outlet), or by an alternative DC voltage input (e.g., a DC power support).

With reference to FIG. 4, the transmission 132 rotatably couples to a motor output shaft 136 and includes a transmission output shaft 138 extending to a lifter 140 of the lifting assembly 120 (FIG. 3). The lifter 140 is operable to move the driver blade 112 from the driven position to the ready position. The transmission 132 provides torque to the lifter 140 from the motor 122. A fan 142 is rotatably coupled to the motor shaft 136 to generate cooling airflow within an interior of the fastener driver 100.

Figure 7:
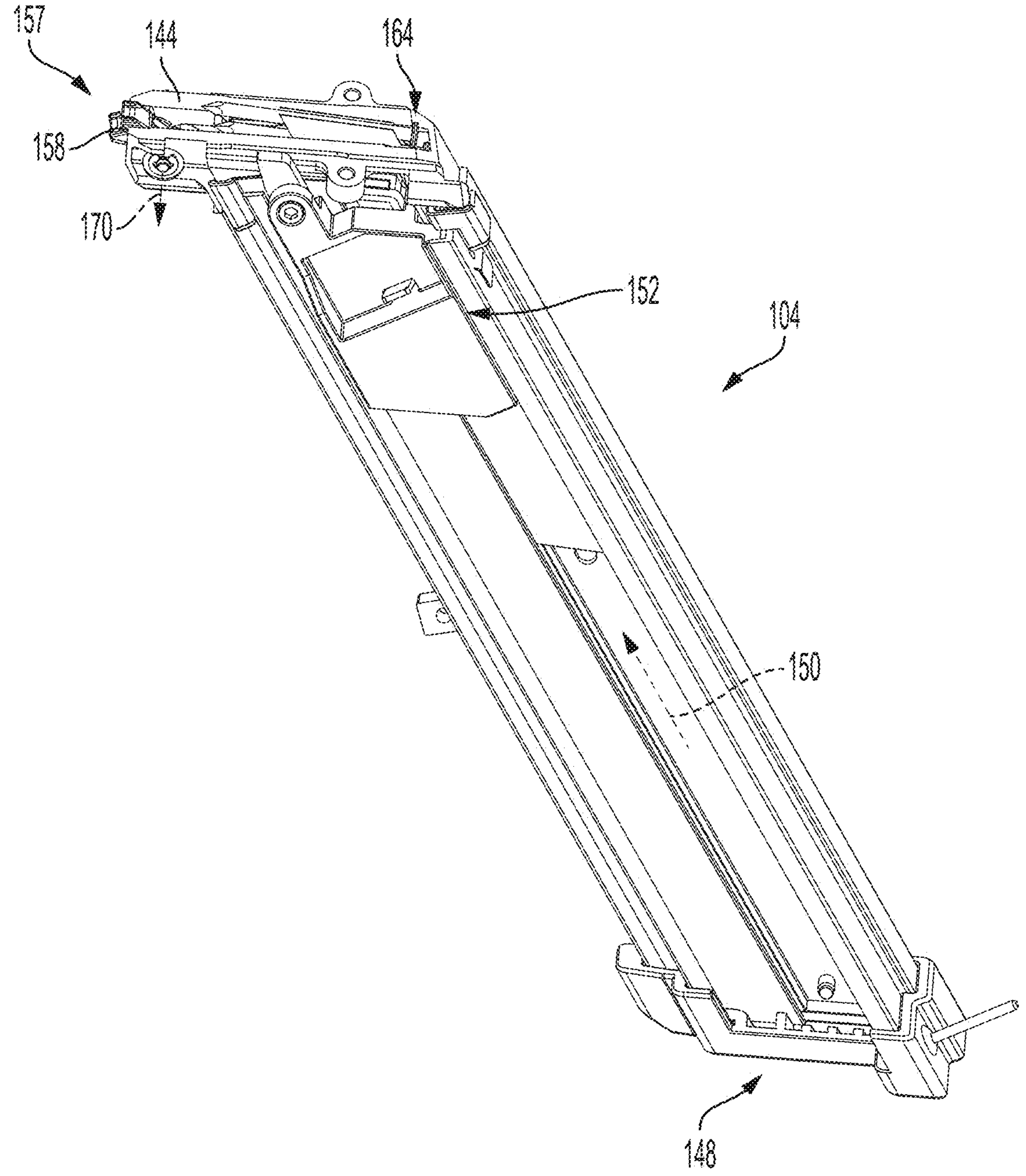
FIG. 7 is a perspective view of a magazine of the fastener driver of FIG. 1.

With reference to FIGS. 6 and 7, a feed-lips or shear block 144 is coupled to the magazine 104, and is fastened to a nosepiece 146 (FIG. 3) of the fastener driver 100 to secure the magazine 104 to the fastener driver 100. The magazine 104 also includes a loading portion 148 at the opposite end that receives the nails 106*a*, 106*b* for loading into the magazine 104. The nails 106*a*, 106*b* enter through the loading portion 148 and advance into a feed channel 150

(FIG. 7) that extends within the magazine 104 from the loading portion 148 to the shear block 144. A pusher 152 is biased toward the shear block 144 and urges the loaded nails 106*a*, 106*b* toward the shear block 144.

Figure 8:
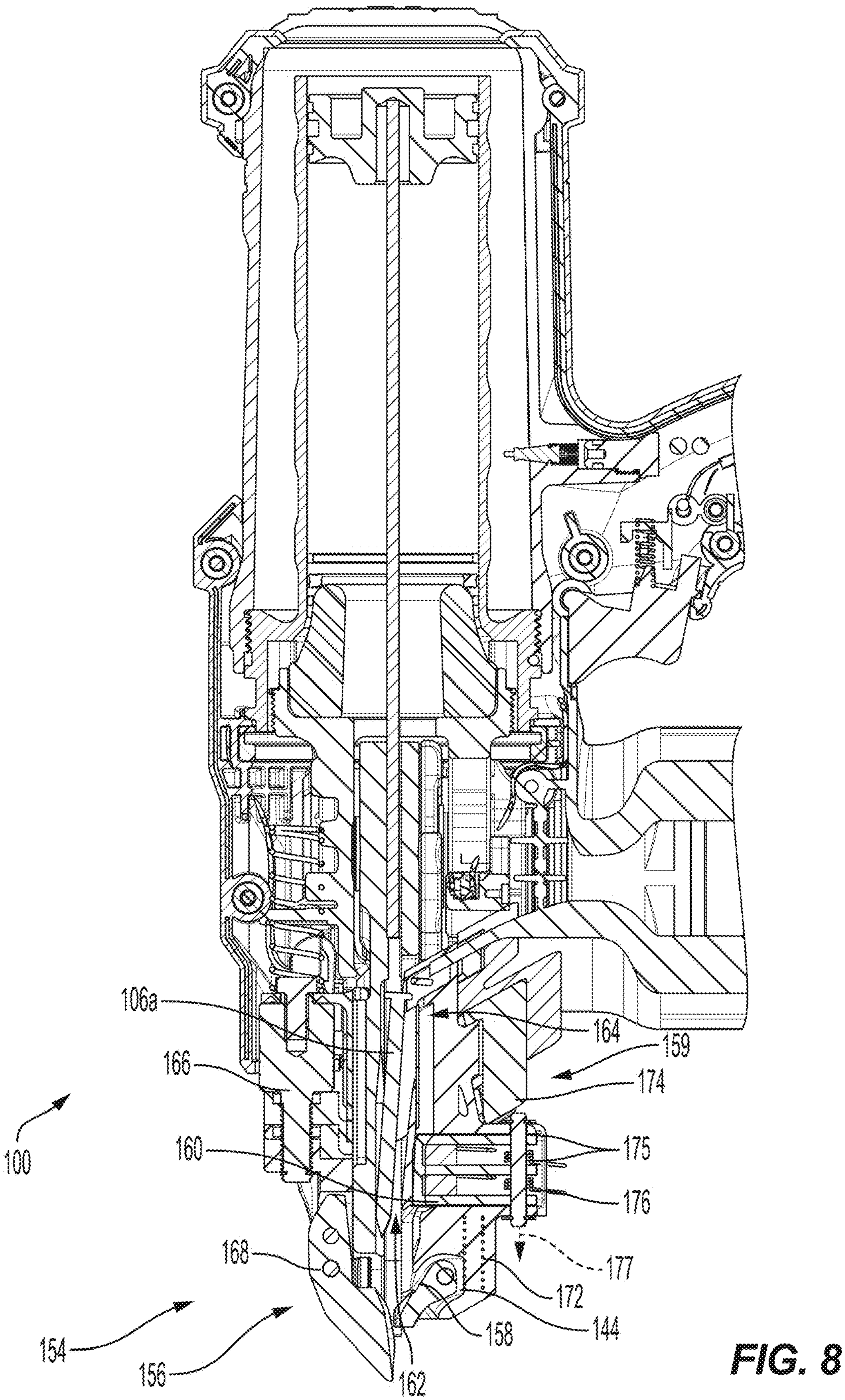
FIG. 8 is a cross-sectional view of the fastener driver of FIG. 1, taken along line 8-8 of FIG. 1.

With reference to FIGS. 1, 7, and 8, the fastener driver 100 includes a nosepiece assembly 154 that includes the shear block 144, the nosepiece 146, a probe tip assembly 156, a tip guide assembly 157, and a nail length selector assembly or nail guide assembly 159. The shear block 144 and the nosepiece 146 cooperatively define a driver channel 162 (FIG. 8) that receives individual nails 106*a*, 106*b* from the collated strip. The driver channel 162 extends generally along the driving axis 118. The shear block 144 defines an opening 164 (FIG. 7) by which the nails 106*a*, 106*b* enter the driver channel 162 from the feed channel 150. In many embodiments, either the shear block 144 or the nosepiece 146 may be referred to as a nosepiece member and either may define the opening 164. In some embodiments, the shear block 144 and the nosepiece 146 may be formed as a single part and referred to as a nosepiece member which defines the opening 164 and the driver channel 162.

With reference to FIG. 8, the probe tip assembly 156 is slidably coupled to the nosepiece 146. When the probe tip assembly 156 is depressed against a workpiece and the trigger 124 is pressed, the fastener driver 100 initiates a fastener driving cycle. The probe tip assembly 156 includes an arm 166 and a probe tip 168 coupled to the arm 166 for co-translation therewith. An interior side of the probe tip 168 is in facing relationship with the driver channel 162 and is engageable with the nail 106*a*, 106*b* during a fastener driving operation to guide the nail 106*a*, 106*b* as it is being ejected from an outlet of the driver channel 162. When driving fasteners into prefabricated metal connectors, holes are provided in the metal connectors through which the fastener is to be projected. It is important that the fastener driver 100 be properly aimed such that the fastener will pass cleanly through the hole and not pierce or impinge against the surrounding metal of the connector. The probe tip 168 can be positioned within the hole to ensure that the fastener will be fired accurately into the hole.

With reference to FIGS. 7 and 8, the tip guide assembly 157 includes a tip guide member 158 that is in facing relationship with the driver channel 162. The tip guide member 158 pivots about a tip guide pivot axis 170 and is arranged to be in contact with the nail 106*a*, 106*b* during a firing operation. The tip guide assembly 157 also includes a spring 172 that biases the tip guide member 158 toward contact with the distal tip of the nail 106*a*, 106*b* so that the tip is accurately guided toward the opening in the metal connector.

With reference to FIGS. 8-14, the nail guide assembly 159 includes a nail guide member 160 which is also arranged in facing relationship with the driver channel 162. The nail guide member 160 pivots laterally toward or away from the driver channel 162 in response to short nails 106*b* or long nails 106*a* passing through the feed channel 150 and into the driver channel 162. The nail guide assembly 159 also includes a pin 174 about which the nail guide member 160 is pivotably supported. In some embodiments, the pin 174 may be provided as a shaft, a bolt, a threaded fastener, or the like. The pin 174 is supported at each end by a pair of flanges 176 defined by the shear block 144. The pin 174 defines a guide member pivot axis 177 about which the nail guide member 160 pivots between first and second positions. In the illustrated embodiment, the guide member pivot axis 177 is approximately parallel to the driving axis 118. The nail guide assembly 159 further includes one or more springs 175 which bias the nail guide member 160 toward a first position (FIG. 10), i.e., toward the driver channel 162 and toward contact with the nails 106*a*, 106*b*.

Figure 14:
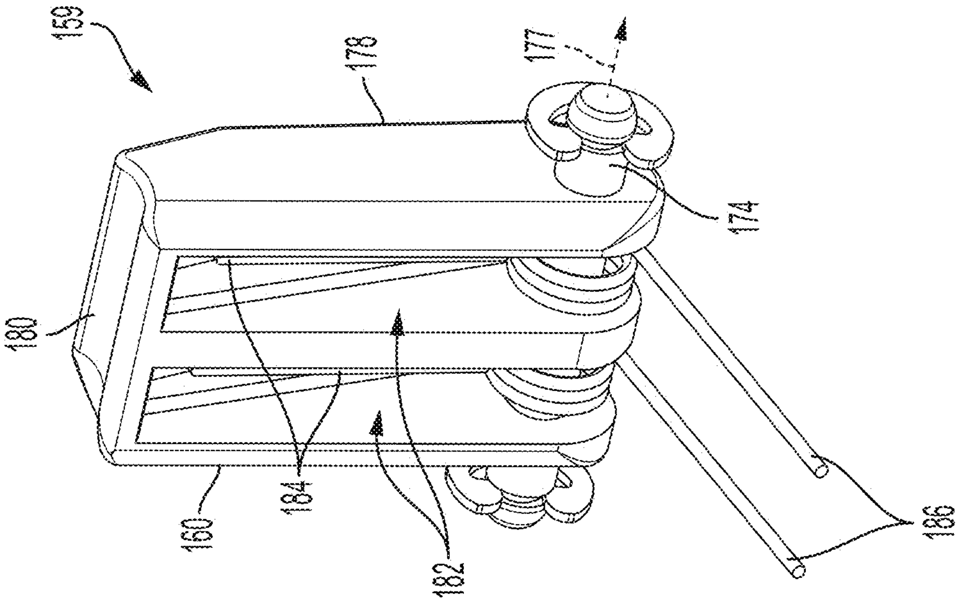
FIGS. 13 and 14 are perspective views showing a nail guide assembly of the fastener driver of FIG. 1, including the short nail guide member.
Figure 13:
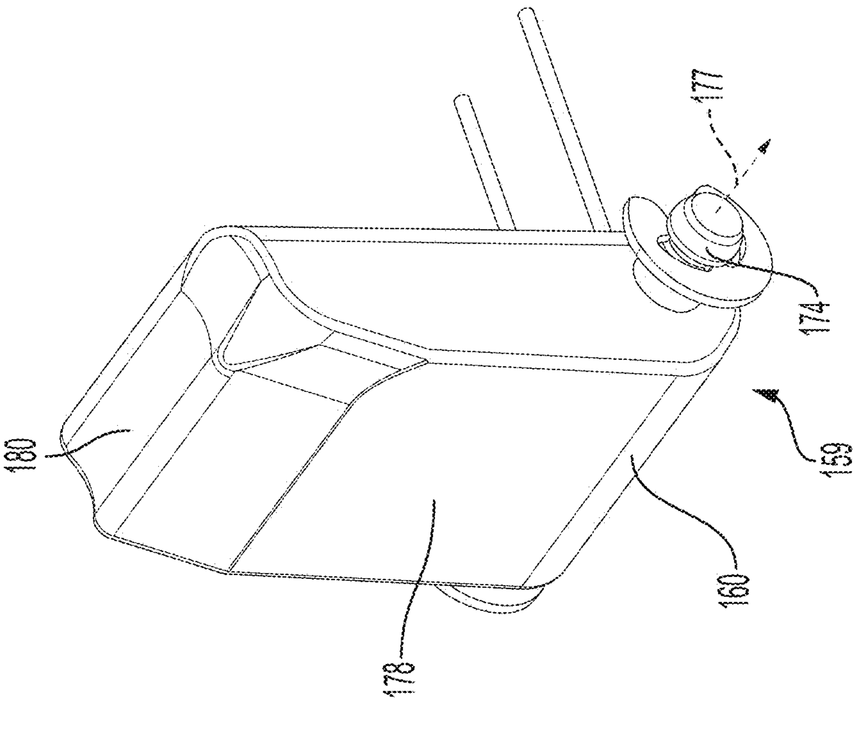

With reference to FIGS. 13 and 14, in the illustrated embodiment, the nail guide member 160 defines a ramped surface 178 which engages the tips of the long nails 106*a*. The nail guide member 160 also defines a guide surface 180 that partially blocks or partially closes the opening 164 and effectively shortens a length of the opening 164. The nail guide member 160 further defines a pair of partially closed recesses 182. The recesses 182 open toward a side of the nail guide member 160 located opposite that of the ramped surface 178. Each recess 182 receives a portion of the pin 174 and portions of the springs 175, including a respective first leg 184 of the springs 175 which contacts and exerts a biasing force upon the nail guide member 160. A second leg 186 of each spring 175 contacts a surface of the shear block 144. Each spring 175 is a torsion spring that is pre-loaded with a biasing force exerted between the first and second legs 184, 186.

Figure 10:
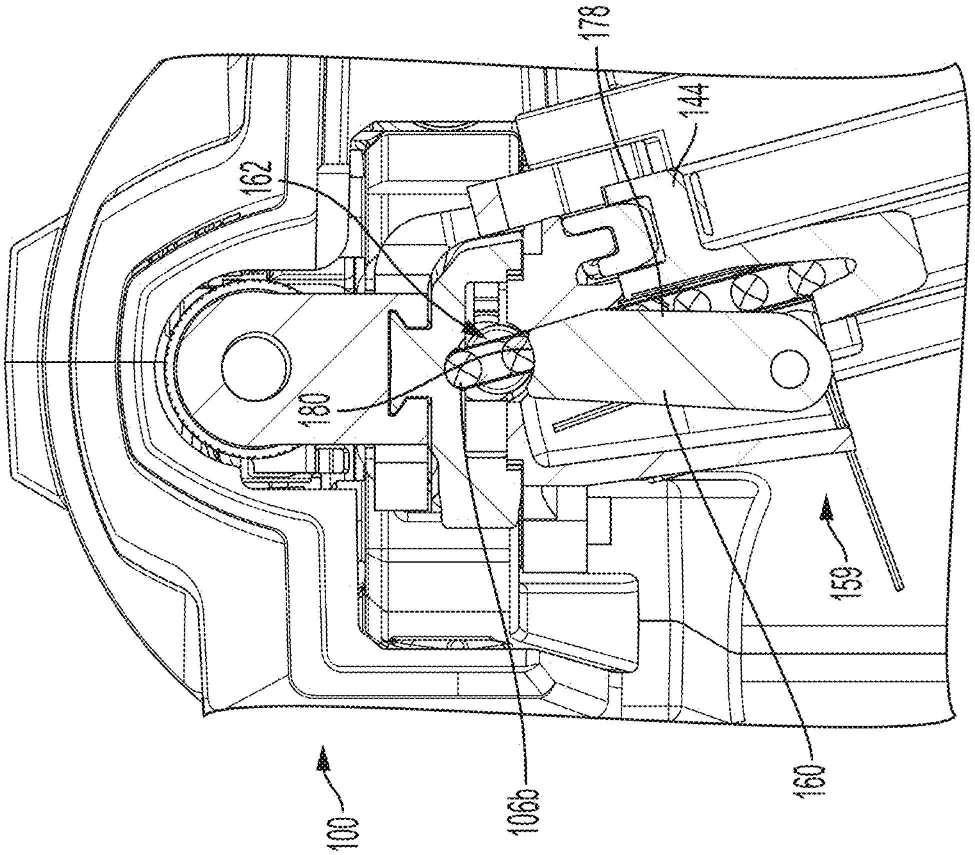
FIG. 10 is another cross-sectional view of the fastener driver of FIG. 1, taken along line 10-10 of FIG. 3 and showing the short nail guide member in the first position.
Figure 9:
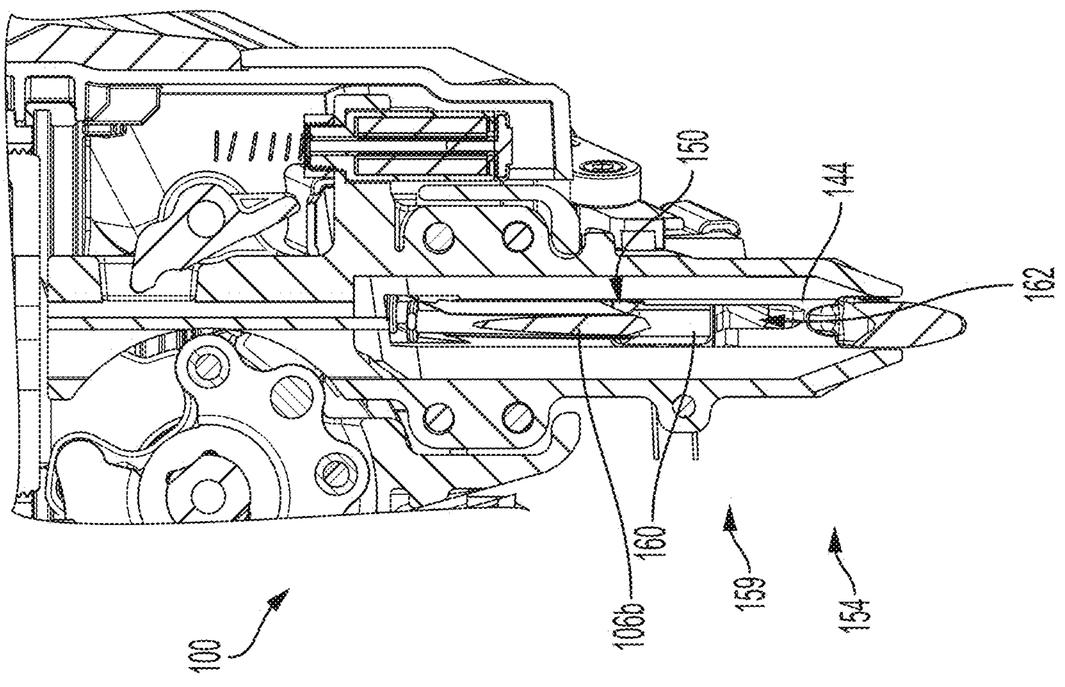
FIG. 9 is another cross-sectional view of the fastener driver of FIG. 1, taken along line 9-9 of FIG. 1 and showing a short nail guide member in a first position.

With reference to FIGS. 9-12, when no nails are loaded into the fastener driver 100, the nail guide member 160 is normally biased by the springs 175 toward the first position shown in FIGS. 9 and 10. Likewise, when short nails 106*b* move through the feed channel 150 and into the driver channel 162 via the opening 164, the short nails 106*b* pass freely by the nail guide member 160, which remains in the first position. In contrast, and as shown in FIGS. 9 and 10, when long nails 106*a* move through the feed channel 150 and into the driver channel 162 via the opening 164, the tips of the long nails 106*a* engage the ramped surface 178 of the nail guide member 160 and urge the nail guide member 160 toward the second position (FIG. 12), against the biasing force exerted by the springs 175.

The opening 164 in the shear block 144 is sufficiently large to permit the long nails 106*a* to pass through and into the driver channel 162. As such, the opening 164 is substantially larger than the short nails 106*b*. When the short nails 106*b* are loaded into the fastener driver 100, the nail guide member 160 resides in the first position (FIGS. 9 and 10) and presents the guide surface 180 that blocks a portion of the opening 164 and effectively shortens a length of the opening 164. The guide surface 180 guides the short nails 106*b* during a driving operation. This helps prevent the short nails 106*b* from becoming skewed during the driving operation and plunging into the opening 164 toward the magazine 104, which can lead to jamming of the short nails 106*b* within the driver channel 162. When the long nails 106*a* move through the opening 164 and into the driver channel 162, the tip of the long nail 106*a* contacts the ramped surface 178 and causes the nail guide member 160 to pivot away from the driver channel 162. Thus, the long nails 106*a* may pass through the opening 164 unobstructed by the nail guide member 160.

Figure 15:
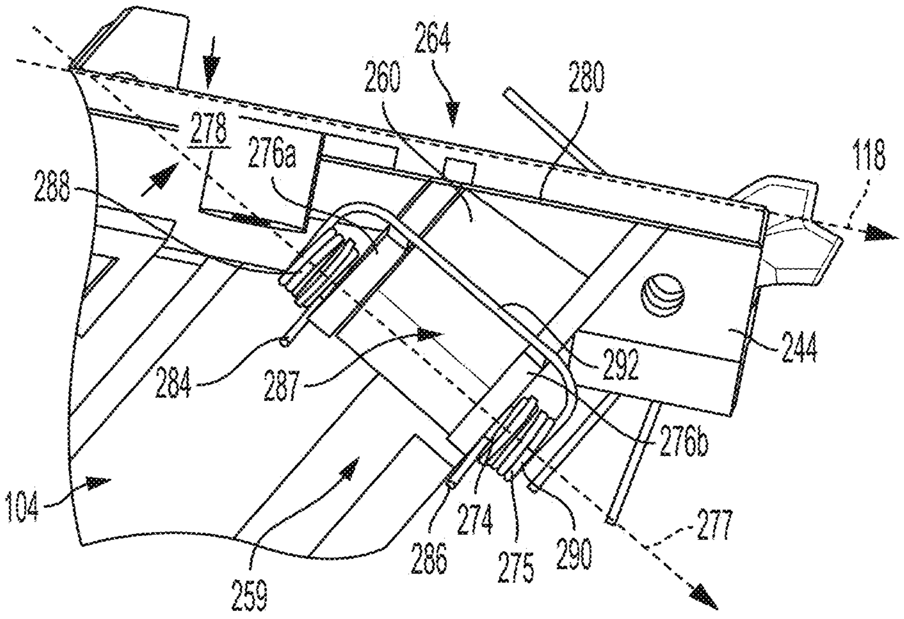
FIGS. 15 and 16 are side views of the magazine of the fastener driver of FIG. 1 with a shear block and a nail guide assembly according to another embodiment of the disclosure.
Figure 16:
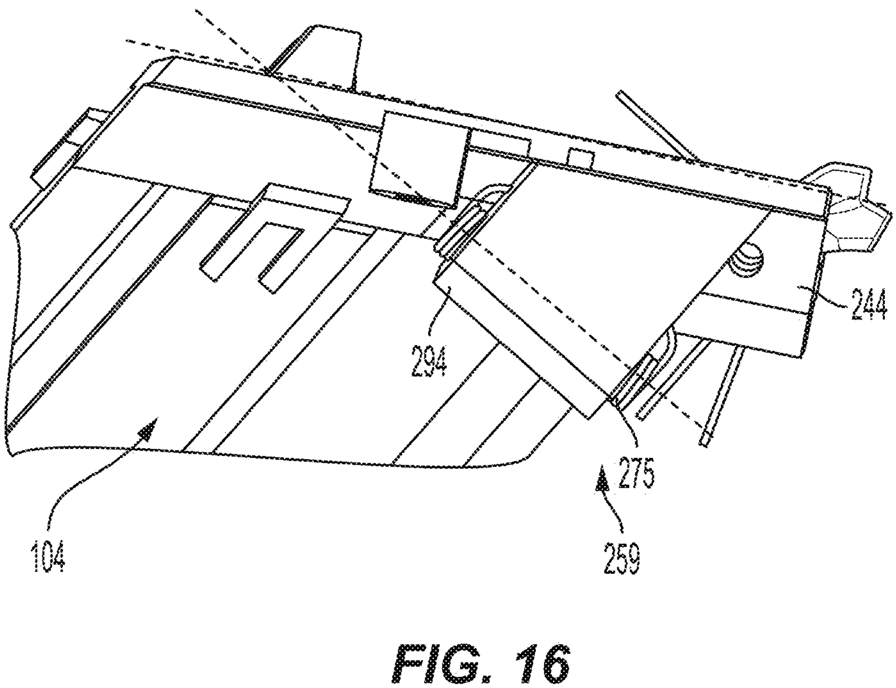

FIGS. 15 and 16 illustrate a nail guide assembly 259 coupled to a shear block 244 according to another embodiment of the disclosure, with like parts having like reference numerals "plus 100" and the following differences explained below. The shear block 244 can be implemented into the magazine 104 in a similar manner as the shear block 144 described above, and the entire assembly may be implemented into the fastener driver 100. Like the shear block 144, the shear block 244 defines an opening (not shown) by which the nails 106*a*, 106*b* enter the driver channel 162 of the fastener driver 100 from the feed channel 150. The nail guide assembly 259 includes a nail guide member 260 which is pivotably supported about a pin 274. Each end of the pin 274 is supported a pair of respective flanges including a first flange 276*a* and a second flange 276*b* each defined by the shear block 244. The pin 274 defines a guide member pivot axis 277 about which the nail guide member 260 pivots between first and second positions. As shown in FIG. 15, a recess or chamber 287 is defined by the shear block 244 between the first and second flanges 276*a*, 276*b*. The nail guide member 260 is positioned at least partially within the chamber 287 in the first position.

In the illustrated embodiment, the guide member pivot axis 277 is oriented nonparallel and oblique to the driving axis 118. Specifically, the guide member pivot axis 277 defines an oblique angle or offset angle 278 with the driving axis 118. The offset angle 278 is approximately 30 degrees in the illustrated embodiment. In other embodiments, the guide member pivot axis 277 can be oblique to the driving axis 118 with the offset angle 278 being less than or greater than 30 degrees. For example, the offset angle 278 can be greater than or equal to 5 degrees and can be less than or equal to 60 degrees. The offset angle 278 can also be greater than or equal to 10 degrees, greater than or equal to 15 degrees, greater than or equal to 18 degrees, greater than or equal to 20 degrees, greater than or equal to 22 degrees, greater than or equal to 25 degrees, greater than or equal to 28 degrees, greater than 30 degrees, greater than or equal to 35 degrees, greater than or equal to 40 degrees, or greater than or equal to 45 degrees.

The nail guide assembly 259 also includes a spring 275 that biases the nail guide member 260 toward a first position (not shown but see FIG. 10 showing a first position of the similar nail guide member 160). In the first position, a guide surface 280 of the nail guide member 260 blocks a portion of the opening 264 and effectively shortens a length of the opening 264. In the embodiment of FIGS. 15 and 16, the spring 275 is a double torsion spring and includes a first coil 288, a second coil 290, a first leg 284, a second leg 286, and a bridge portion 292. As shown in FIG. 15, the first and second coils 288, 290 and the first and second legs 284, 286 are disposed outside of the chamber 287 and beyond the flanges 276*a*, 276*b*. More specifically, the first leg 284 and the first coil 288 are disposed outside of the chamber 287 and adjacent the first flange 276*a*. The second leg 286 and the second coil 290 are disposed outside the chamber 287 and adjacent the second flange 276*b*. The bridge portion 292 engages the nail guide member 260 to urge the nail guide member 260 toward the first position. However, the bridge portion 292 also does not extend within the chamber 287, because the bridge portion 292 is positioned laterally beyond the flanges 276*a*, 276*b*.

FIG. 16 further illustrates a cover 294 that partially covers the nail guide member 260 and the bridge portion 292 of the spring 275. The cover 294 can be formed as a portion of the housing 126 of the fastener driver 100 and can function to, e.g., shield the nail guide assembly 259 from dust, dirt, or other debris. For example, the cover 294 can be formed as a portion of one or both of the clamshell housing halves 126*a*, 126*b*.

Figure 17:
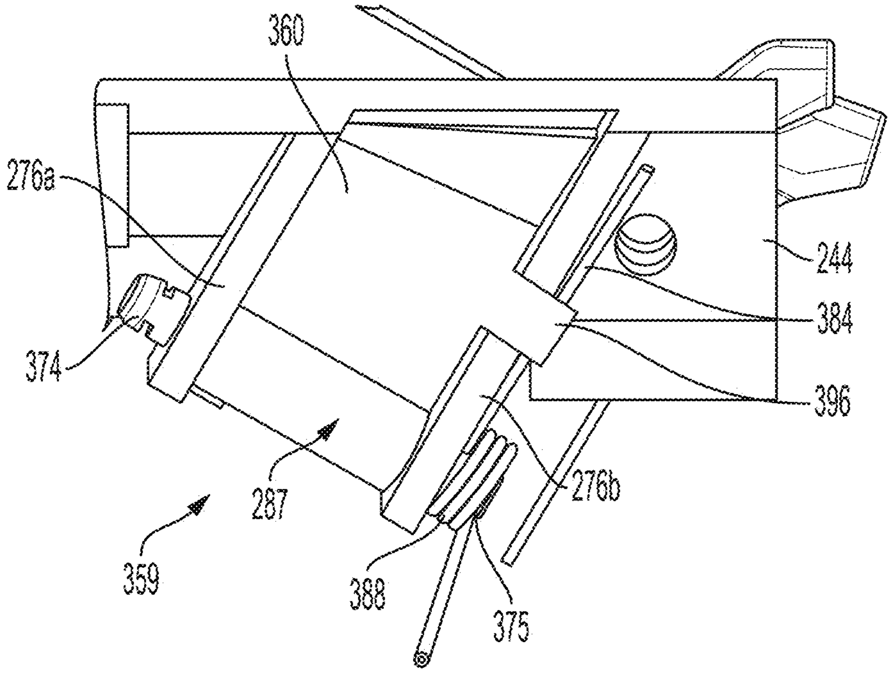
FIG. 17 is a side view of a nail guide assembly according to another embodiment of the disclosure.

FIG. 17 illustrates a nail guide assembly 359 according to another embodiment of the disclosure, with like parts having like reference numerals "plus 200" and the following differences explained below. The nail guide assembly 359 is coupled to the shear block 244 and is similar to the nail guide assembly 259 already described herein. The nail guide assembly 359 includes a nail guide member 360, a pin 374 defining an oblique guide member pivot axis (not shown), and a spring 375. Unlike the spring 275 described herein, the spring 375 is a single torsion spring having a single coil 388 supported at just one end of the pin 374. Specifically, the spring 375 is located adjacent the second flange 276*b* nearest to the tip guide member 158. And, unlike the nail guide member 260 described herein, the nail guide member 360 includes a laterally protruding tab 396 that engages a first leg 384 of the spring 375. As such, the spring 375 is located entirely outside of the chamber 287 defined between the flanges 276*a*, 276*b* of the shear block 244. The tab 396 likewise protrudes outside of the chamber 287 and beyond the second flange 276*b*.

Figure 18:
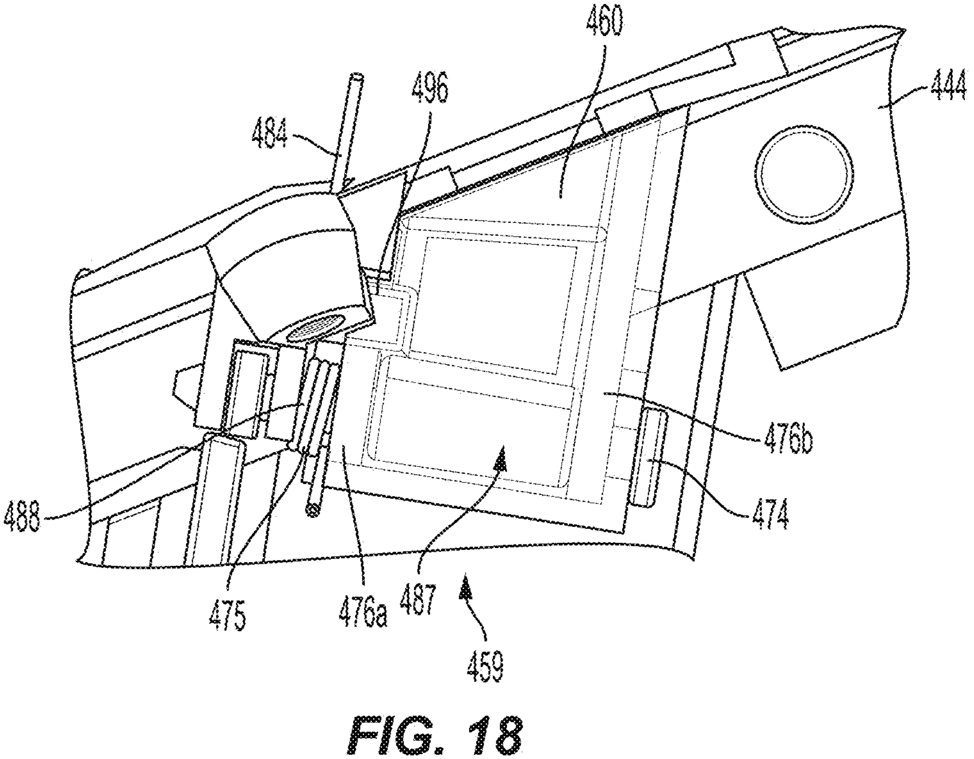
FIG. 18 is a side view of a nail guide assembly according to another embodiment of the disclosure.

FIG. 18 illustrates a nail guide assembly 459 coupled to a shear block 444 according to another embodiment of the disclosure, with like parts having like reference numerals "plus 300" and the following differences explained below. The shear block 444 can be implemented into the magazine 104 in a similar manner as the shear block 144 described above, and the entire assembly may be implemented into the fastener driver 100. The nail guide assembly 459 includes a nail guide member 460, a pin 474 defining an oblique guide member pivot axis (not shown), and a spring 475. The shear block 444 includes flanges 476*a*, 476*b* which define a chamber 487 therebetween, and the nail guide member 460 resides at least partially within the chamber 487 in the first position. The spring 475 is a single torsion spring having a single coil 488 supported at just one end of the pin 474. Specifically, the spring 475 is located adjacent the first flange 476*a* located furthest from the tip guide member 158. Unlike the nail guide member 360 described herein, the nail guide member 460 includes a laterally protruding tab 496 that engages a first leg 484 of the spring 475. As such, the spring 475 is located entirely outside of the chamber 487 defined between the flanges 476*a*, 476*b* of the shear block 444. The tab 496 likewise protrudes outside of the chamber 487 and beyond the first flange 476*a*.

Figure 19:
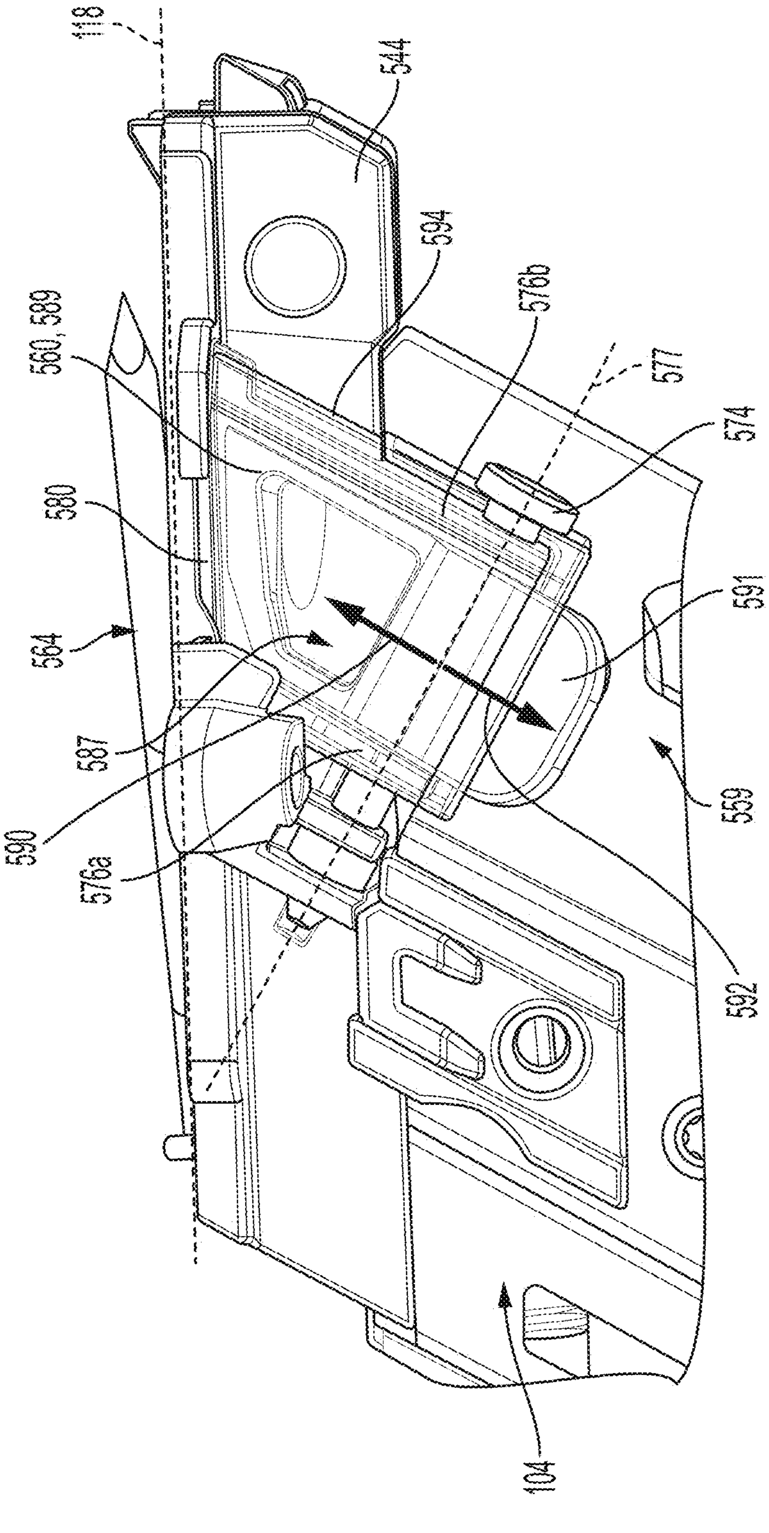
FIG. 19 is a side view of a nail guide assembly according to another embodiment of the disclosure.
Figure 20:
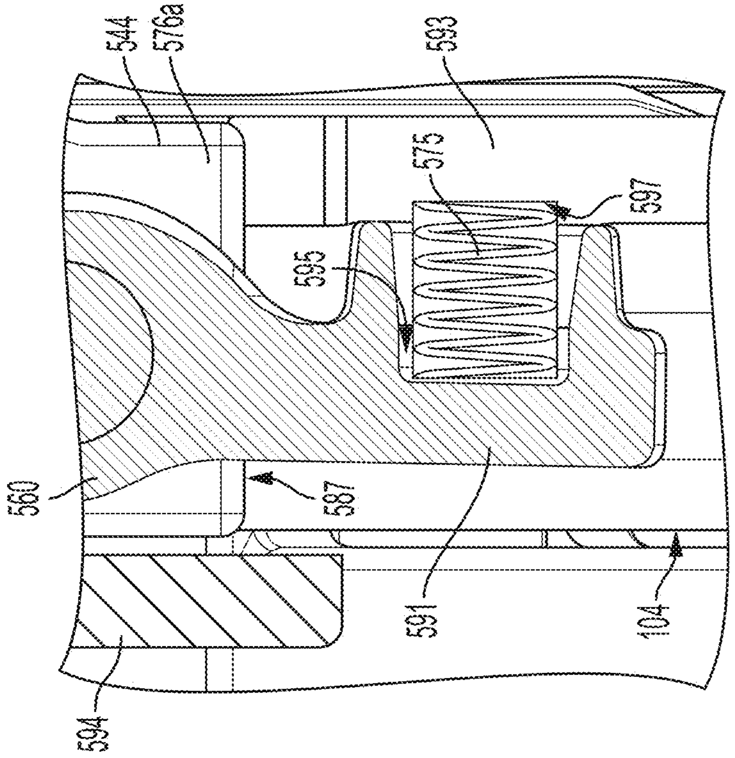
FIG. 20 is a cross-sectional view of the nail guide assembly of FIG. 19.

FIGS. 19 and 20 illustrate a nail guide assembly 559 coupled to a shear block 544 according to another embodiment of the disclosure, with like parts having like reference numerals "plus 400" and the following differences explained below. The shear block 544 can be implemented into the magazine 104 in a similar manner as the shear block 144 described above, and the entire assembly may be implemented into the fastener driver 100. The nail guide assembly 559 includes a nail guide member 560, a pin 574 defining an oblique guide member pivot axis 577, and a spring 575. The spring 575 biases the nail guide member 560 toward a first position (not shown but see FIG. 10 showing a first position of the similar nail guide member 160). In the first position, a guide surface 580 of the nail guide member 560 blocks a portion of the opening 564 and effectively shortens a length of the opening 564.

The shear block 544 includes flanges 576*a*, 576*b* which define a chamber 587 therebetween, and the nail guide member 560 resides at least partially within the chamber 587 in the first position. A cover 594 partially covers the nail guide member 560 and the first and second flanges 576*a*, 576*b*. The cover 594 can be formed as a portion of the housing 126 of the fastener driver 100 (FIG. 1) and can function to, e.g., shield the nail guide assembly 559 from dust, dirt, or other debris. For example, the cover 594 can be formed as a portion of one or both of the clamshell housing halves 126*a*, 126*b*.

Figure 12:
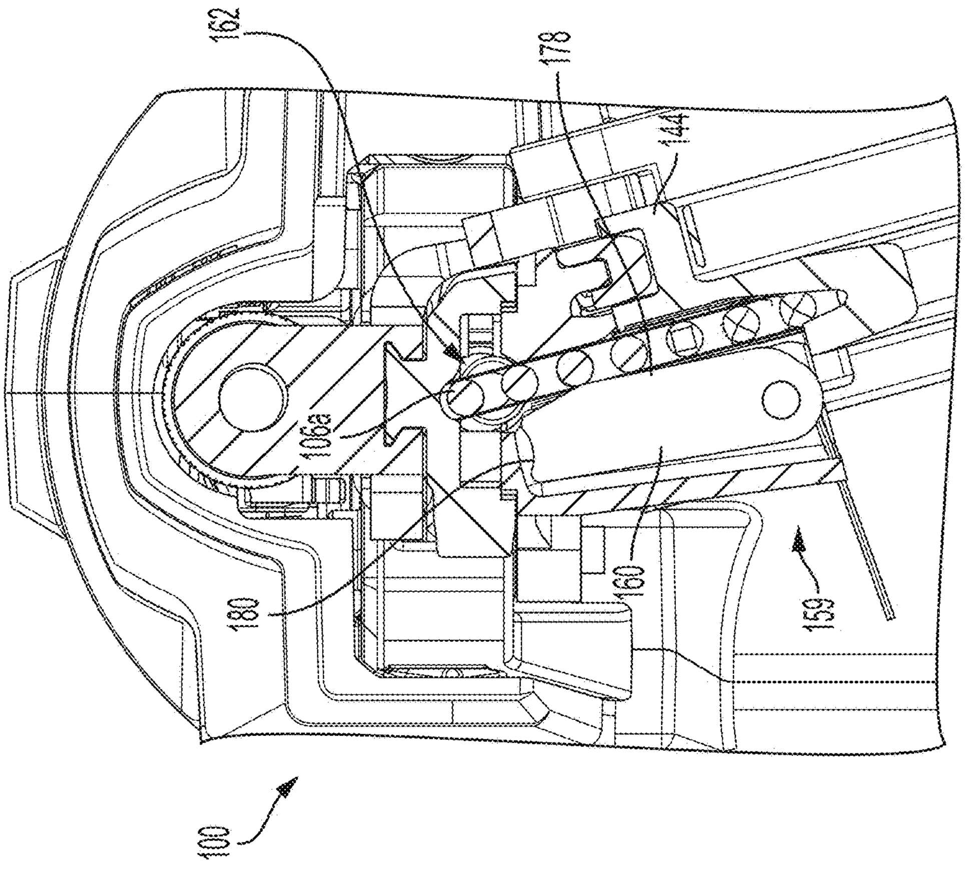
FIG. 12 is another cross-sectional view of the fastener driver of FIG. 1, taken along line 10-10 of FIG. 3 and showing the short nail guide member in the second position.

The nail guide member 560 includes a guide portion 589 and a pressing portion 591 (e.g., a spur). The guide portion 589 protrudes away from the pivot axis 577 in a first direction 590, and the pressing portion 591 protrudes away from the pivot axis 577 in a second direction 592 that is different from the first direction 590. In some embodiments, the first direction 590 and the second direction 592 define an obtuse angle with respect to the pivot axis 577. In some embodiments, the first direction 590 is opposite the second direction 592. The guide portion 589 defines the guide surface 580. The pressing portion 591 protrudes out of the chamber 587, beyond a lower end of the first and second flanges 576*a*, 576*b*, and beyond a lower end of the cover 594. The pressing portion 591 is accessible to the user and can be pressed by the user to pivot the nail guide member 560 from the first position to a second position, or bypass position (not shown, but see FIG. 12 showing the second position of the nail guide member 160).

With reference to FIG. 20, in some embodiments, the spring 575 is a coil spring positioned between the pressing portion 591 of the nail guide member 560 and a wall 593 of the magazine 104. In other embodiments, the spring 575 can be formed as another biasing member, such as an elastically deformable elastomer. In the illustrated embodiment, the pressing portion 591 of the nail guide member 560 defines a first seat 595 which receives and holds one end of the spring 575. The wall 593 of the magazine defines a corresponding second seat 597 which retains and holds another end of the spring 575. In the illustrated embodiment, the first and second seats 595, 597 define cylindrical recesses which receive the ends of the spring 575 therein. As shown in FIG. 20, the spring 575 is located outside the chamber 587, beyond the lower end of the first and second flanges 576*a*, 576*b*, and beyond the lower end of the cover 594. Specifically, the spring 475 is located adjacent the first flange 476*a* located furthest from the tip guide member 158.

Figure 21:
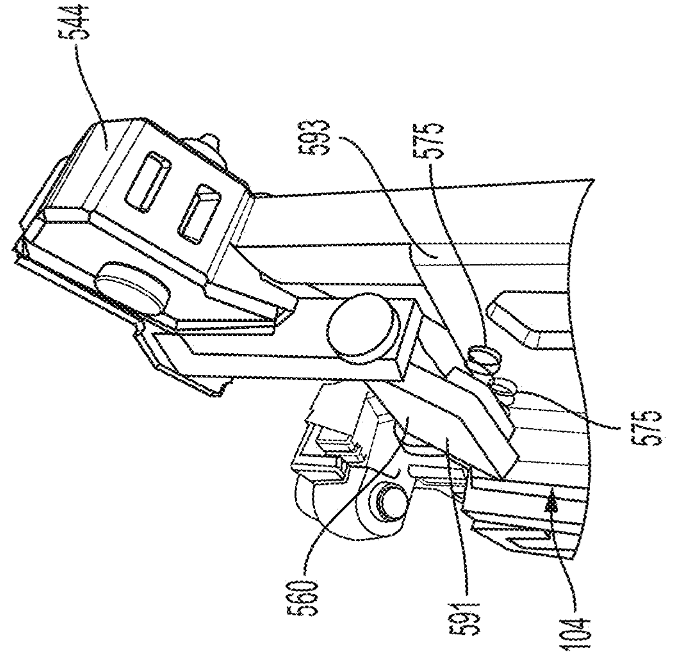
FIG. 21 is a perspective view of the nail guide assembly of FIG. 19 having two springs.

With reference to FIG. 21, in some embodiments, the nail guide assembly 559 includes two springs 575 arranged between the pressing portion 591 and the wall 593 of the magazine 104.

Although the disclosure has been described in detail with reference to certain preferred embodiments, variations and modifications exist within the scope and spirit of one or more independent aspects of the disclosure as described.

What is claimed is:

1. A powered fastener driver for driving fasteners of a first length and fasteners of a second length greater than the first length along a driving axis, the powered fastener driver comprising:
- a magazine configured to receive the fasteners of the first length and the fasteners of the second length; and
- a nosepiece assembly defining a driver channel extending along the driving axis, the nosepiece assembly including
  - a nosepiece member coupled to the magazine and defining an opening by which the fasteners of the first length and the fasteners of the second length pass from the magazine into the driver channel, and
  - a nail guide assembly including
    - a nail guide member defining a nail guide surface, the nail guide member being pivotable relative to the nosepiece member about a pivot axis between a first position at which the nail guide surface partially closes the opening, and a second position at which the nail guide surface is not aligned with the opening, and
    - a biasing member biasing the nail guide member toward the first position;
- wherein in response to the fasteners of the second length being loaded into the magazine the nail guide member is moved to the second position; and
- wherein the pivot axis defines an oblique angle with the driving axis.

2. The powered fastener driver of claim 1, wherein the oblique angle is greater than or equal to 5 degrees and less than or equal to 60 degrees.

3. The powered fastener driver of claim 2, wherein the oblique angle is greater than or equal to 20 degrees.

4. The powered fastener driver of claim 1, wherein the nosepiece member includes a flange, and wherein the nail guide assembly further includes a pin supported by the flange and coupling the nail guide member to the nosepiece member, the pin defining the pivot axis.

5. The powered fastener driver of claim 4, wherein the flange is a first flange and the nosepiece member further includes a second flange supporting the pin, the first flange and the second flange defining a chamber in which the nail guide member is at least partially positioned in the first position, and wherein the biasing member is positioned outside of the chamber.

6. The powered fastener driver of claim 5, wherein the nail guide member includes a tab that extends outside of the chamber, and wherein the biasing member comprises a spring having an end portion that engages the tab.

7. The powered fastener driver of claim 1, wherein the biasing member is positioned between the nail guide member and a wall of the magazine.

8. The powered fastener driver of claim 7, wherein the nail guide member includes a pressing portion that defines a first seat, the first seat receiving a first end of the biasing member, and wherein the wall of the magazine defines a second seat, the second seat receiving a second end of the biasing member.

9. The powered fastener driver of claim 1, wherein the nail guide member includes a guide portion extending away from the pivot axis in a first direction and a pressing portion extending away from the pivot axis in a second direction different than the first direction, and wherein the pressing portion is configured to be pressed to move the nail guide member from the first position to the second position.

10. The powered fastener driver of claim 9, wherein the guide portion defines the nail guide surface, and wherein the pressing portion contacts the biasing member.

11. The powered fastener driver of claim 10, wherein the first direction and the second direction define an obtuse angle with respect to the pivot axis.

12. The powered fastener driver of claim 10, wherein the first direction is opposite the second direction.

13. A powered fastener driver for driving fasteners of a first length and fasteners of a second length greater than the first length along a driving axis, the powered fastener driver comprising:
- a magazine configured to receive the fasteners of the first length and the fasteners of the second length; and
- a nosepiece assembly defining a driver channel extending along the driving axis, the nosepiece assembly including
  - a nosepiece member coupled to the magazine and defining an opening by which the fasteners of the first length and the fasteners of the second length pass from the magazine into the driver channel, and
  - a nail guide assembly including
    - a nail guide member that is pivotable relative to the nosepiece member about a pivot axis between a first position and a second position, the nail guide member including a guide portion extending away from the pivot axis in a first direction and a pressing portion extending away from the pivot axis in a second direction different than the first direction, and a biasing member biasing the nail guide member toward the first position;

wherein the guide portion defines a nail guide surface that partially closes the opening in the first position;

wherein the pressing portion is configured to be pressed to move the nail guide member from the first position to the second position; and wherein the nail guide surface is not aligned with the opening in the second position.

14. The powered fastener driver of claim 13, wherein the first direction and the second direction define an obtuse angle with respect to the pivot axis.

15. The powered fastener driver of claim 13, wherein the first direction is opposite from the second direction.

16. The powered fastener driver of claim 13, wherein the pivot axis defines an oblique angle with the driving axis.

17. A powered fastener driver for driving fasteners of a first length and fasteners of a second length greater than the first length along a driving axis, the powered fastener driver comprising:

a magazine configured to receive the fasteners of the first length and the fasteners of the second length; and a nosepiece assembly defining a driver channel extending along the driving axis, the nosepiece assembly including a nosepiece member coupled to the magazine and defining an opening by which the fasteners of the first length and the fasteners of the second length pass from the magazine into the driver channel, and a nail guide assembly including a nail guide member defining a nail guide surface, the nail guide member being pivotable relative to the nosepiece member about a pivot axis between a first position at which the nail guide surface partially closes the opening, and a second position at which the nail guide surface is not aligned with the opening, and a biasing member biasing the nail guide member toward the first position;

wherein in response to the fasteners of the second length being loaded into the magazine the nail guide member is moved to the second position; and wherein the biasing member is positioned between the nail guide member and a wall of the magazine.

18. The powered fastener driver of claim 17, wherein the nail guide member defines a first seat, the first seat receiving a first end of the biasing member, and wherein the wall of the magazine defines a second seat, the second seat receiving a second end of the biasing member.

19. The powered fastener driver of claim 18, wherein the nail guide member includes a guide portion extending away from the pivot axis in a first direction and a pressing portion extending away from the pivot axis in a second direction different than the first direction, and wherein the pressing portion is configured to be pressed to move the nail guide member from the first position to the second position.

20. The powered fastener driver of claim 19, wherein the pressing portion defines the first seat.

* * * * *